United States Patent [19]
Leoni et al.

[11] Patent Number: 5,152,949
[45] Date of Patent: Oct. 6, 1992

[54] TOOLING METHOD FOR RESIN TRANSFER MOLDING

[75] Inventors: Peter B. Leoni, Bethany; Philip Ramey, Milford; Alexander C. Dublinski, Northford, all of Conn.

[73] Assignee: United Technologies Corporation, Hartford, Conn.

[21] Appl. No.: 630,144

[22] Filed: Dec. 19, 1990

[51] Int. Cl.⁵ ..................... B29C 43/18; B29C 45/14
[52] U.S. Cl. .................................. 264/257; 264/314; 264/328.7; 425/417
[58] Field of Search ............... 264/257, 258, 314, 313, 264/317, 510, 511, 512, 328.7, 328.8; 425/417

[56] References Cited

U.S. PATENT DOCUMENTS

| | | | |
|---|---|---|---|
| 4,808,362 | 2/1989 | Freeman | 264/257 |
| 4,891,176 | 1/1990 | Drysdale et al. | 264/257 |
| 4,942,013 | 7/1990 | Palmer et al. | 264/257 |
| 5,071,338 | 12/1991 | Dublinski et al. | 425/403 |
| 5,087,193 | 2/1992 | Herbert, Jr. | 264/314 |

*Primary Examiner*—Jay H. Woo
*Assistant Examiner*—James P. Mackey
*Attorney, Agent, or Firm*—Terrance J. Radke

[57] ABSTRACT

A method for resin transfer molding composite articles of complex configuration that have high fiber-to-resin ratios. The molding apparatus includes a compliant mold subassembly having one or more conformable cauls and a complementary, non-permeable membrane that function, in combination, as a semi-rigid molding tool. The compliant mold subassembly is relatively insensitive to bulk variations of layed-up fiber reinforcement material, facilitating fiber reinforcement material lay up and closure of the molding apparatus. The compliant mold subassembly provides uniform pressures during various molding stages, i.e., resin injection, expulsion of excess resin, curing, to enhance the homogeneity and dimensional stability of the finished composite article. The semi-rigid aspect of the compliant mold subassembly facilitates demolding of the finished composite article. The process utilizes stage pressurization transmitted through the compliant mold subassembly to enhance resin flow for complete, uniform saturation of fiber reinforcement layups and to expel excess resin prior to curing of the resin-impregnated fiber reinforcement layups.

1 Claim, 7 Drawing Sheets

TOOLING METHOD FOR RESIN TRANSFER MOLDING

The Government has rights in this invention pursuant to Contract No. DAAJ02-90-C-0007 awarded by the Department of the Army.

TECHNICAL FIELD

This invention relates to a method and apparatus for molding high strength composite articles, and more particularly, to a resin transfer molding method and apparatus utilizing staged pressurization and a conformable mold subassembly to fabricate composite articles having complete, uniform resin saturation and high fiber-to-resin ratios.

BACKGROUND OF THE INVENTION

Resin transfer molding (RTM) is a process wherein dry fiber reinforcement plys/preforms are loaded in a mold cavity defining the configuration of the article to be fabricated and saturated/wetted by a flowable, thermoset resin. Saturation is effected by introducing the resin into the mold plenum under a pressure differential that causes the resin to flow through and saturate the fiber reinforcement preforms. Representative examples of RTM processes are described in U.S. Pat. Nos. 4,942,013 and 4,891,176.

The primary advantage of the RTM process resides in its potential for high rates of production. Other advantages include the capability to accurately locate internal details, to control outer and inner mold line surfaces and part thicknesses, and savings in material and labor. Use of the RTM process, however, has typically been limited to low strength, simple configuration articles (as compared to high strength, complex configuration aerospace structures) due to difficulties associated with the RTM process and RTM molding assemblies.

Conventional RTM molding assemblies consist of matched metal male/female molds (tools) made from rigid machined metal. Matched metal molds are expensive to fabricate, especially where such molds include internal mandrels that are necessary to form complex configurations such as reverse flanges. Molds for such complex configurations must be fabricated in intricate geometric patterns to facilitate mandrel insertion/removal, and such elaborate geometric configurations require increased labor and time expenditures to fabricate the basic mold assembly.

Other difficulties associated with the RTM process and apparatus include stabilizing and debulking the fiber reinforcement preforms for use in the RTM process, and loading the preforms into the mold cavity. It is often necessary to "build-up" the mold assembly around the fiber reinforcement preforms, a labor intensive and time consuming procedure. Maintaining adequate tolerances may be difficult. Matched metal molds have locked-in cross sections that make mold closure and sealing difficult due to the bulk of the fiber reinforcement preforms.

In addition, large complex fiber reinforcement preforms subjected to resin transfer molding often experience partial resin curing prior to saturation of the entire preform, resulting in partially-saturated composite structures of diminished strength. To compensate for this effect, prior art RTM processes have utilized large pressure differentials to ensure saturation of the entire preform.

Large pressure differentials, however, may result in composite structures having fiber-to-resin ratios on the order of about 30 to about 45 percent. This is in contrast to composite structures formed from prepregs which have fiber-to-resin ratios of about 60 to about 65 percent, such ratios providing composite articles having good structural strength. A low fiber-to-resin ratio, in contrast, results in a composite structure having reduced structural strength. For RTM processes, it is accepted practice to apply a 20% knockdown factor on the mechanical properties of the finished composite article in acknowledgement of the lower fiber-to-resin ratio.

With regard to fabricating complex configuration composite articles, the aforedescribed difficulties may result in disorientated fibers, areas which are resin rich or lean, depending upon bulk variations of the preform, and/or porosity. Any of these conditions reduces the specific strength of the composite article. Due to process and materials costs, rejection of a single fabricated article may negate the cost savings available by utilizing the resin transfer molding method.

SUMMARY OF THE INVENTION

The present invention is directed to an apparatus and method for resin transfer molding (RTM) high strength fiber-reinforced composite articles at high rates and low costs. The molding apparatus includes a compliant mold subassembly that facilitates lay up of fiber reinforcement plys/preforms, closure of the molding apparatus, and accommodates bulk variations of layed-up plys/preforms. The compliant mold subassembly provides uniform pressures during molding stages to enhance the homogeneity and dimensional stability of the finished composite article, and the flexibility of the compliant mold subassembly facilitates demolding of the finished composite article.

The molding apparatus and process of the present invention utilize staged pressurization to provide complete and uniform resin saturation of fiber reinforcement plys/preforms, and expulsion of excess resin. Composite articles fabricated according to the apparatus and method of the present invention have fiber-to-resin ratios that provide good mechanical properties, i.e., comparable to composite articles fabricated from prepregs.

The molding apparatus of the present invention includes a rigid mold subassembly and a compliant mold subassembly. The rigid mold subassembly includes a conventional, structurally rigid mold wherein the inner surfaces of the rigid mold cavity define the outer mold line surfaces of the composite article to be fabricated. The rigid mold subassembly further includes a cover plate configured for detachable securement to the rigid mold, means for internally pressurizing the molding apparatus, means for evacuating the fiber reinforcement layup, and means for injecting a thermoset resin into the fiber reinforcement layup.

The compliant mold subassembly includes one or more conformable cauls and a non-permeable, flexible bladder/liner which, in combination, function as a semi-rigid molding tool in the RTM process and apparatus according to the present invention. The conformable cauls are semi-rigid, shaped members having a predetermined degree of flexibility that allows the cauls to conform to the inner surface of the fiber reinforcement plys/preforms and to provide uniform pressure for resin impregnation of the fiber reinforcement layup, expulsion of excess resin from the fiber reinforcement layup, and composite article curing. The cauls, which have facing surfaces that define the inner mold line surfaces of the composite article to be fabricated, are installed in the mold cavity with the facing surfaces in opposed relation to the inner surfaces of the mold. The facing surfaces and inner surfaces in combination define the overall configuration of the composite article to be fabricated.

The conformable cauls facilitate the fabrication of composite articles having complex configurations such as integral beaded stiffeners and/or incorporating structural inserts such as foam cores and/or rigid mandrels. The conformable cauls may also be utilized for integral fabrication of internal details of the composite article. The cauls may further be used for laying up fiber reinforcement plys/preforms. In addition, the cauls may be used as the base tool for forming fiber reinforcement preforms.

Each conformable caul is fabricated prior to use from reinforced tooling material, i.e, an elastomer-impregnated fiber reinforcement material that is encapsulated in elastomeric sheets, that is disposed in combination with unreinforced elastomeric material and layed up over a model of the part and cured. Fluoroelastomers and polyaramid fibers are the preferred materials for fabricating the conformable cauls.

The non-permeable, flexible bladder/liner, which may be shaped or non-shaped. comprises the complementary portion of the compliant mold subassembly and is operative to conformably engage the non-facing surfaces of the conformable cauls. The bladder/liner is installed in the mold cavity and sealingly secured between the cover plate and the rigid mold such that the cover plate and bladder/liner in combination define a pressure chamber. The bladder/liner provides sealing between adjacent conformable cauls and transfers pressure forces between the pressure chamber and the conformable cauls.

The first phase of the process of the present invention involves setup of the molding apparatus. Fiber reinforcement plys/preforms and the conformable cauls are sequentially installed in the rigid mold cavity such that the fiber reinforcement layup of the composite article to be fabricated is disposed in the plenum, i.e., the space between the conformable cauls and the rigid mold. One setup method involves laying up of fiber reinforcement preforms on the inner surfaces of the rigid mold and then sequentially installing conformable cauls, having fiber reinforcement plys layed up on the facing surfaces thereof, in the mold cavity in correspondence with the fiber reinforcement preforms. Other setup methods may be utilized, depending upon the particular application and the nature of the composite article to be fabricated. The bladder/liner is installed in the mold cavity, and the cover plate detachably secured to the rigid mold to complete setup of the molding apparatus.

If a non-shaped bladder/liner is utilized, the plenum is evacuated so that residual pressure in the pressure chamber biases the bladder/liner into conformance with the conformable cauls. The pressure chamber is pressurized to a first predetermined pressure that causes the bladder/liner to expand to bias adjacent conformable cauls together and to provide sealing therebetween. The bladder/liner supports the conformable cauls against the fiber reinforcement layup such that the plenum defines the net dimensions of the composite article to be fabricated. Simultaneously, the plenum is evacuated (if not previously accomplished), and an RTM resin is then injected under pressure into the evacuated plenum. The pressure differential across the conformable cauls is of sufficient magnitude to bias the cauls away from the rigid mold, thereby causing a predetermined expansion of the plenum. The expansion of the plenum facilitates enhanced resin flow in the plenum that results in complete saturation of the fiber reinforcement layup.

After resin impregnation of the fiber reinforcement layup, the pressure chamber is pressurized to a second predetermined pressure that is transferred via the bladder/liner to bias the conformable cauls into the resin-impregnated fiber reinforcement layup, restoring the plenum to its original net dimensions. The biasing action exerted by the conformable cauls causes excess resin to be expelled from the plenum, thereby enhancing the fiber-to-resin ratio of the resin-impregnated fiber reinforcement layup. The biasing action also ensures complete fiber wet-out.

The molding apparatus is then transferred to an oven and cured. After curing is complete, the molding apparatus is opened by removing the cover plate, and the bladder/liner is removed. The conformable cauls may then be sequentially removed, the flexibility of the cauls facilitating separation of the cauls from the finished composite article.

The foregoing and other features and advantages of the present invention will become more apparent from the following description and accompanying drawings.

BRIEF DESCRIPTION OF THE DRAWINGS

A more complete understanding of the present invention and the attendant advantages and features thereof will be more readily understood by reference to the following detailed description when considered in conjunction with the accompanying drawings wherein.

DETAILED DESCRIPTION OF PREFERRED EMBODIMENTS

Figure 1:
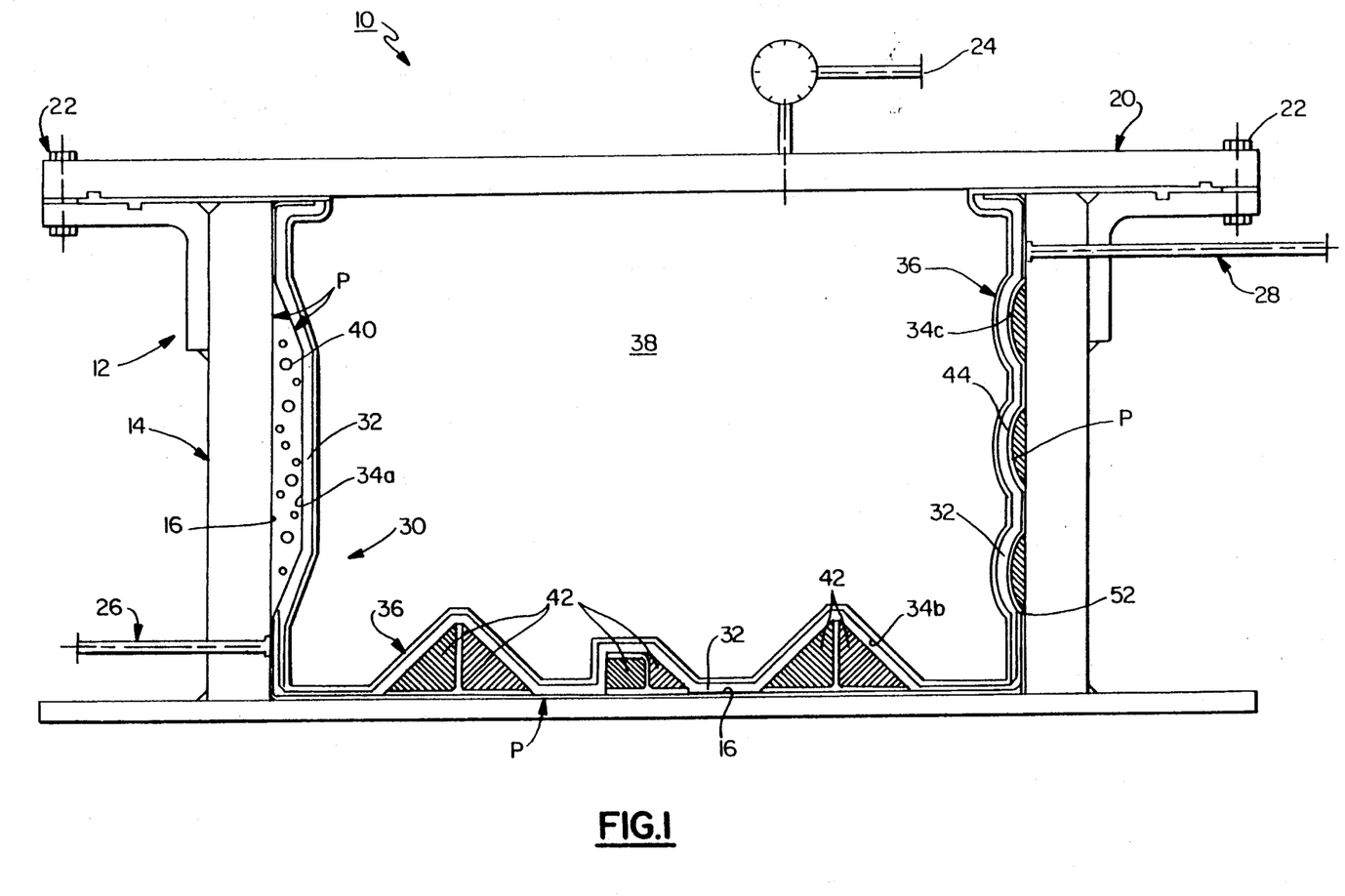
FIG. 1 is a cross-sectional view of a composite article mold assembly according to the present invention.

Referring to the drawings wherein like reference numerals designate corresponding or similar elements throughout the several views, an exemplary embodiment of a composite article mold assembly 10 for the resin transfer molding (RTM) process of the present invention is illustrated in FIG. 1. The mold assembly 10 includes a compliant mold subassembly that is relatively insensitive to bulk variations of layed-up fiber reinforcement plys/preforms, thereby facilitating layup of fiber reinforcement plys/preforms and closure of the mold assembly. The compliant mold subassembly ensures that uniform pressures are provided during various molding stages (resin injection; expulsion of excess resin; curing) to enhance the homogeneity and dimensional stability of the finished composite article. The compliant mold subassembly is readily removed from the finished composite article, thereby facilitating demolding of finished composite articles, especially composite articles having complex configurations such as reverse flanges that would normally be locked into a rigid mold assembly after cure.

The mold assembly 10 and process according to the present invention utilize staged pressurization transmitted through the compliant mold subassembly to enhance resin flow for complete, uniform saturation of fiber reinforcement layups. Excess resin is expelled as a result of the staged pressurization to produce a composite article having complete fiber wet-out and a fiber-to-resin ratio comparable to that of a composite article fabricated from prepregs.

The mold assembly 10 of the present invention comprises a rigid mold subassembly 12 and a compliant mold subassembly 30. The rigid mold subassembly 12 includes a female mold 14 formed by conventional methods such as machining from a structurally rigid material such as steel. The inner surfaces 16 of the female mold 14 define a mold cavity 18 (see FIG. 2A) for laying-up fiber reinforcement plys/preforms P. The inner surfaces 16 of the female mold 14 also define the outer mold line surfaces of the composite article to be fabricated.

The rigid mold subassembly 12 also includes a cover plate 20 detachably secured to the female mold 14 by securing means 22 such as bolts. A pressurization port 24, connected to a pressurization source (not shown), extends through the cover plate 20. One or more resin injection ports 26, connected to a source of RTM resin (not shown), extend through the wall(s) of the female mold 14. One or more vents 28 also extend through the wall(s) of the female mold 14. At least one vent 28 is connected to a vacuum source (not shown).

The compliant mold subassembly 30 includes one or more conformable cauls 32, the number of cauls 32 depending upon the configuration of the composite article to be fabricated, and a non-permeable, flexible bladder/liner 36. The cauls 32 and the bladder/liner 36 in combination function as a semi-rigid membrane for the RTM molding process and apparatus of the present invention.

The conformable cauls 32 are semi-rigid shaped members formed from a fiber-reinforced elastomeric material, as described hereinbelow in further detail, that possess a predetermined degree of flexibility so that the cauls 32 conform to the inner surfaces of the composite article to be fabricated and provide uniform pressure for resin injection, expulsion of excess resin, and composite article curing. The conformable cauls 32 are configured as internal tooling for use in combination with the rigid female mold 14, the cauls 32 having facing surfaces/edges 34 that define the inner mold line surfaces of the composite article to be fabricated. The conformable cauls 32 are installed in the mold cavity 18 with the facing surfaces 34 in opposed relation to the inner surfaces 16 of the female mold 14, the facing surfaces 34 and the inner surfaces 16 in combination defining the overall configuration of the composite article to be fabricated.

The conformable cauls 32 provide the adaptability to fabricate composite articles of complex configuration and/or to incorporate inserts within the composite article. For example, with reference to FIG. 1, one facing surface 34a is configured so that a foam core 40, formed from a closed cell foam material such as rohacell, may be disposed intermediate fiber reinforcement plys/preforms P. Another facing surface 34b is configured to accommodate rigid mandrels 42 that provide structurally strengthened indented surface areas in the finished composite article. Yet another facing surface 34c is configured to form, in combination with the inner surface 16, beaded stiffeners 44 in the finished composite article.

The conformable cauls 32 may also be used for laying up fiber reinforcement plys/preforms P prior to installing the cauls 32 into the female mold 14. The cauls 32 may further be used as tooling for forming fiber reinforcement preforms P for the RTM process of the present invention.

The conformable cauls 32 may also be utilized in pairs to form internal details, such as bulkheads, for the composite article. To form an internal detail, fiber reinforcement plys/preforms P are layed up on the facing surface 34 of each conformable caul 32, and the pair of cauls 32 are installed in the mold cavity 18 with the facing surfaces 34 in opposed relation.

The conformable cauls 32 described in the preceding paragraphs are preferably fabricated according to the method described in U.S. Pat. No. 5,071,338, filed Dec. 3, 1987, entitled "Tooling for Forming Complex Composite Articles", which is owned by the assignee of the present invention, and which is incorporated herein by reference. Each caul 32 is formed from reinforced tooling material, i.e., elastomer-impregnated fiber reinforcement material that is encapsulated in elastomeric material, that is disposed in combination with unreinforced elastomeric material.

Fluoroelastomers such as FLUOREL® (3M Company, St. Paul, Minn.), a fully-saturated fluorinated polymer containing more than 60% fluorine by weight, or VITON® (E.I. du Pont de Nemours Corp., Wilmington, Del.), a series of fluoroelastomers based on a copolymer of vinylidene fluoride and hexafluoropropylene, are the preferred elastomeric materials due to their inertness, usability at high temperatures, and hardness range of about 70 to about 80 durometers. Other elastomers possessing similar characteristics such as halogenated elastomers, fluorosilicone elastomers, or fluorophophazene elastomers may also be used.

Polyaramid fibers or fabric such as KEVLAR® (E.I. du Pont de Nemours Corp.), an aromatic polyamide fiber of extremely high tensile strength and greater resistance of elongation than steel, is the preferred fiber reinforcement material due to its high tear strength, tensile strength and modulus of elasticity. Other fiber reinforcement material such as graphite or glass fibers may also be used. The fiber reinforcement material utilized should provide stiffness and rigidity in detail areas while concomitantly providing sufficient flexibility and stretch to provide uniform compaction of the fiber reinforcement layup.

The elastomeric material is dissolved in a suitable solvent (about 80 to 99% by volume) such as an alkyl aromatic solvent, e.g., toluene (methylbenzene) or 2-butanone (methyl ethyl ketone), to form an elastomeric solution consisting of about 90 to about 95% solvent by volume. The elastomeric solution should not contain any elastomeric precipitate or undissolved higher weight polymers.

The elastomeric solution is coated onto the fiber reinforcement material, typically in the form of a fabric fabricated from a plurality of interwoven bundles of fibers, to completely impregnate the material wherein each fiber is totally encapsulated by the elastomeric solution. The solvent is then completely evaporated from the material using conventional techniques such as flashing or evaporation.

The impregnated material is then sandwiched between elastomeric sheets by conventional techniques such as calendering or pressing to form a reinforced tooling material. Reinforced tooling material and unreinforced elastomeric material are then layed up over a model that matches the shape of the finished article (or a section thereof such as a conformable caul 32) to form a semi-rigid tool. The number of layers of reinforced tooling material and unreinforced elastomeric material required to form a semi-rigid tool such as a conformable caul 32, i.e., the thickness of the caul 32, depends upon the particular application.

The layed-up model is then vacuum bagged and a vacuum applied to ensure precise forming of the caul material to the features of the model. After compaction, the vacuum-bagged model may then be cured to form the conformable caul 32. An exemplary curing cycle includes curing at about 300°-400° F., at about 100-200 psi pressure, for about 3-5 hours, and post-curing at about 400°-500° F., at atmospheric pressure, for about 8-10 hours. Prior to use, the conformable cauls 32 may be conditioned to preclude adhesion of the cauls 32 to the finished composite article. A mold release agent, such as MS-142 (Miller Stevenson Co., Danbury, Conn.), a sprayable liquid consisting of 4% TEFLON ® (a registered trademark of E.I. du Pont de Nemours for tetrafluoroethylene fluorocarbon polymers or fluorinated ethylene-propylene resins) dispersed in a 96% carrier mix of alcohol and freon, is applied to the conformable caul 32 and the coated caul 32 is then baked at about 350° F. for about two hours.

Conformable cauls 32 fabricated as described in the preceding paragraphs are stable throughout a plurality of thermal cycles and therefore possess the added benefit of being reusable (approximately 50 to 100 cycles). The cauls 32 are not susceptible to amine curing agents typically present in conventional RTM epoxy resins, thereby enhancing their utility. The mechanical properties of the cauls 32 do not experience significant degradation over time, and minor damage to the cauls 32 may be rectified by coating the damaged portion with the above-described elastomeric solution.

The non-permeable, flexible bladder/liner 36, which comprises the complementary portion of the compliant mold subassembly 30, is operative to conformably engage the non-facing surfaces of the conformable cauls 32. The bladder/liner 36 is further operative to provide sealing between adjacent cauls 32 and to transfer pressure forces between the internal pressure chamber of the mold 10 and the non-facing surfaces of the conformable cauls 32.

Preferably the bladder/liner 36 is preformed to have a shaped surface area that is coincident with the non-facing surfaces of the conformable cauls 32 such that when the bladder/liner 36 is installed in the mold cavity 18, the bladder/liner 36 conformably engages the non-facing surfaces of the conformable cauls 32. Alternatively, the bladder/liner 36 may be fabricated with a non-shaped surface area such that the installed bladder/liner 36 does not conform to the non-facing surfaces of the conformable cauls 32. Under the influence of a pressure differential, however, the non-shaped surface of the bladder/liner 36 will be biased into conformance with the non-facing surfaces of the conformable cauls 32. The bladder/liner 36 may be formed from an elastic material such as nylon or an elastomeric material such as silicone, neoprene, or nitrile rubbers, the selected material being non-permeable to the pressure inducing medium.

The flexible bladder/liner 36 is inserted in the mold cavity 18 in opposed relation to the non-facing surfaces of the conformable cauls 32. The edges of the bladder/liner 36 are positioned between the cover plate 20 and corresponding edges of the rigid female mold 14 and secured therebetween when the cover plate 20 is detachably secured to the rigid mold 14 with the securing bolts 22. The edges of the flexible bladder/liner 36 form a pressure seal between the cover plate 20 and the rigid female mold 14 such that the cover plate 20 and the flexible bladder/liner 36 in combination define a pressure chamber 38 within the composite article mold assembly 10.

Figure 2A:
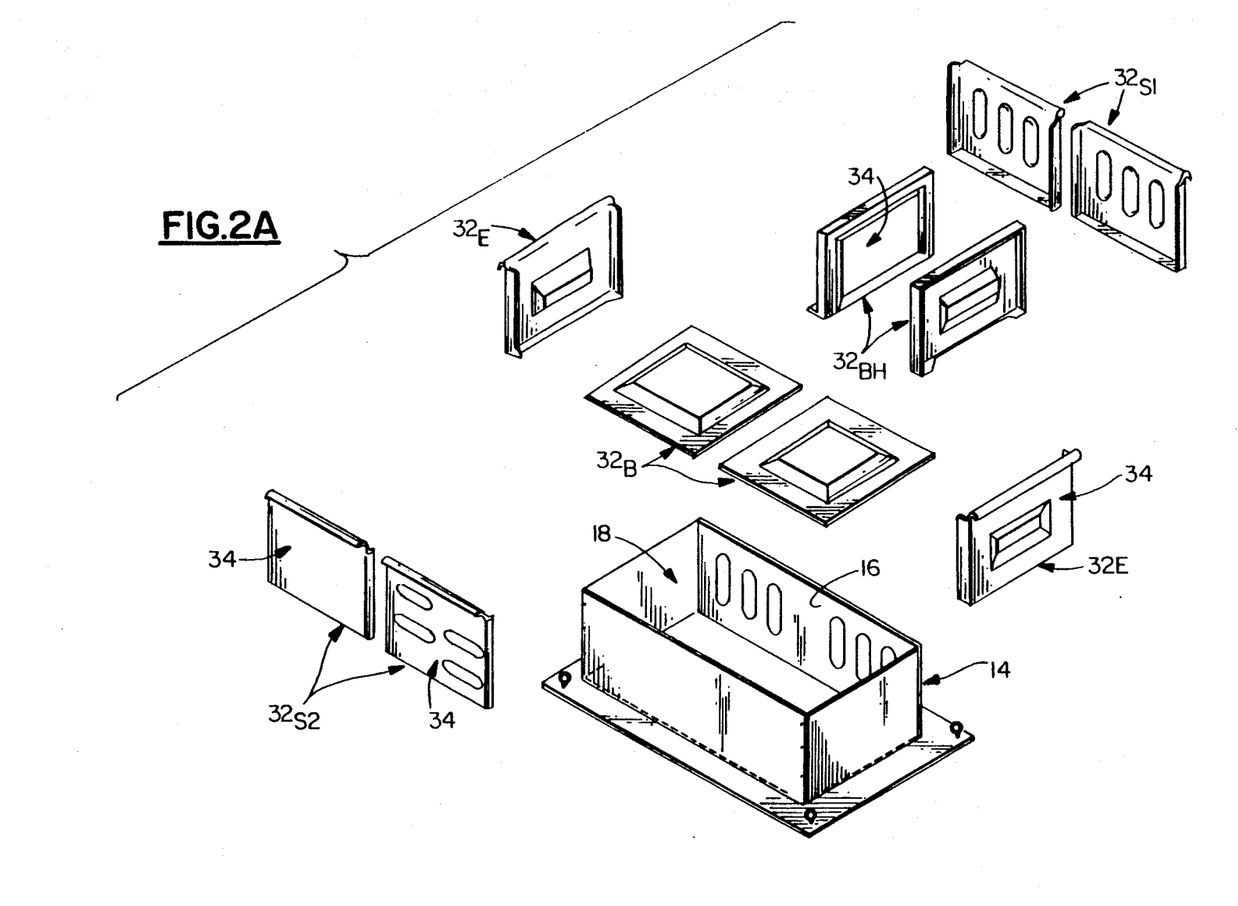
FIGS. 2A–2G illustrate exemplary steps utilizing the RTM process and molding apparatus of the present invention.

An exemplary process utilizing the composite article mold assembly 10 of the present invention to fabricate a keel beam torque box assembly that is part of the mainframe chassis of a helicopter is described in the following paragraphs. Referring to FIG. 2A, the composite article mold assembly 10 for the process includes the structurally rigid female mold 14 and a plurality of conformable cauls 32. The inner surfaces 16 of the female mold 14 define the outer mold line surfaces of the article to be fabricated, which in the case of the keel beam torque box assembly includes closed cell foam cores 40 and beaded stiffeners 44.

The plurality of conformable cauls 32, which define the inner mold line surfaces of the keel beam torque box assembly, have been prefabricated as described hereinabove. For the fabrication of the keel beam torque box assembly, the plurality of conformable cauls 32 includes a pair of bottom wall cauls $32_B$, first and second pairs of sidewall cauls $32_{S1}$, $32_{S2}$, and endwall cauls $32_E$. The plurality of conformable cauls 32 also includes a pair of bulkhead cauls $32_{BH}$.

Figure 2B:
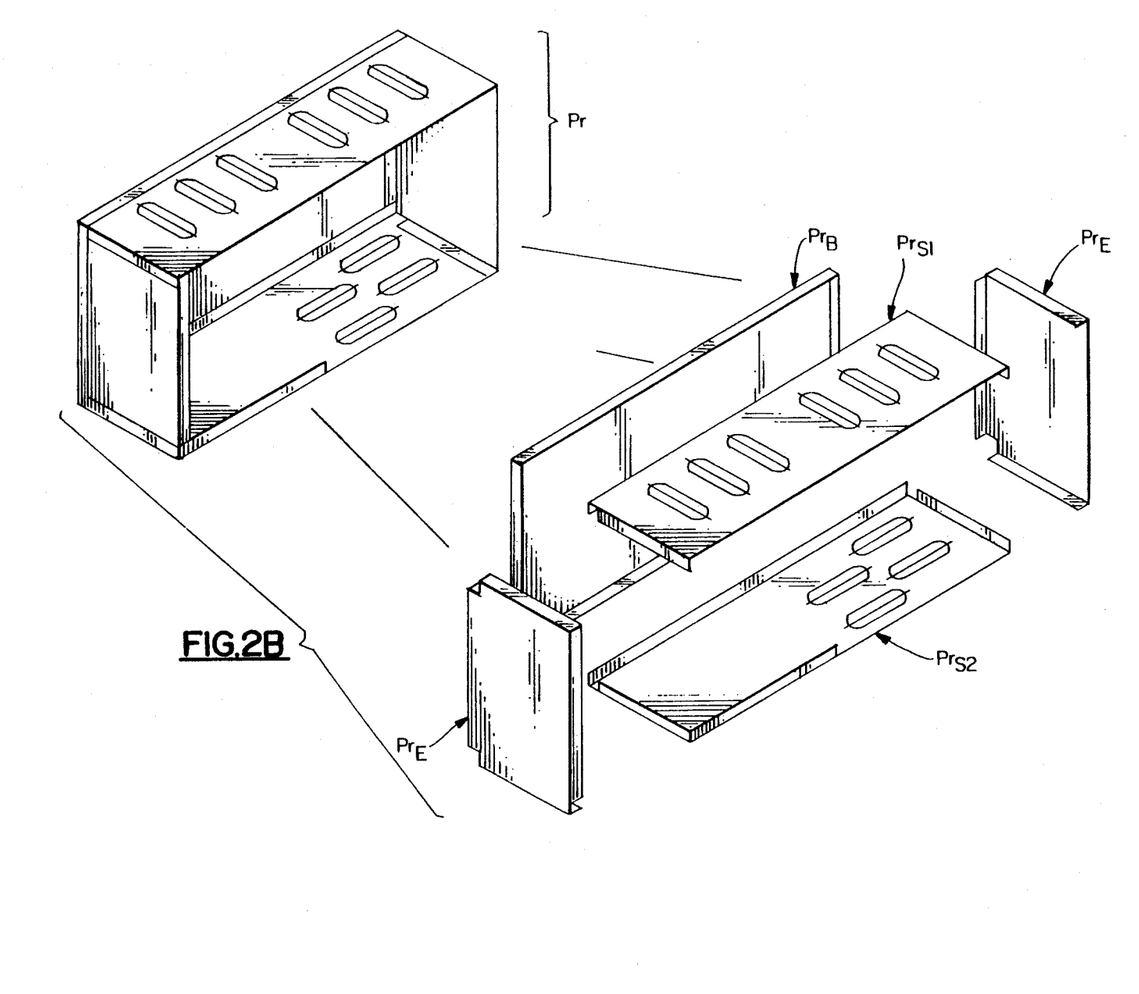

The first step in the process is the lay up of fiber reinforcement plys/preforms P in the mold assembly 10. To fabricate the keel beam torque box assembly, both fiber reinforcement preforms Pr and plys Pl may be utilized. Outer fiber reinforcement preforms Pr are sequentially layed up in the mold cavity 18 against the inner surfaces 16 of the rigid female mold 14. As shown in FIG. 2B, the outer fiber reinforcement preforms Pr include a single bottom wall preform $Pr_B$, first and second sidewall preforms $Pr_{S1}$, $Pr_{S2}$, and a pair of end wall preforms $Pr_E$ that are configured to interfit when sequentially layed up in the female mold 14 in the order described. For clarity, the female mold 14 has been omitted from FIGS. 2B-2E, it being understood that the female mold 14 surrounds the interfitted outer fiber reinforcement preforms Pr illustrated in FIG. 2B.

Figure 2C:
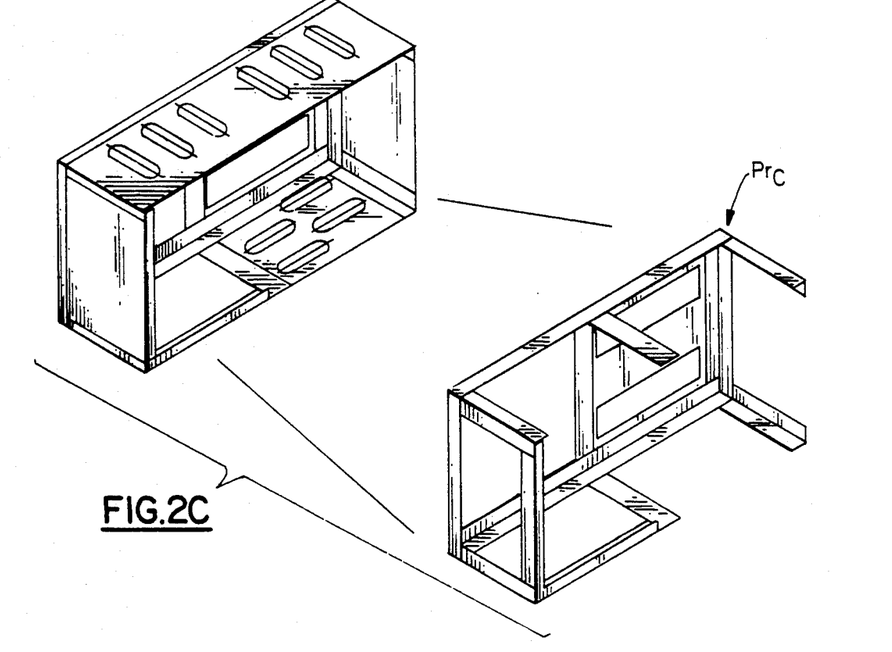

Fiber reinforcement cap preforms $Pr_C$ are then layed up on the interfitted outer fiber reinforcement preforms Pr as illustrated in FIG. 2C. The cap preforms $Pr_C$ provide smooth seams where the conformable cauls 32 will overlap.

Figure 2D:
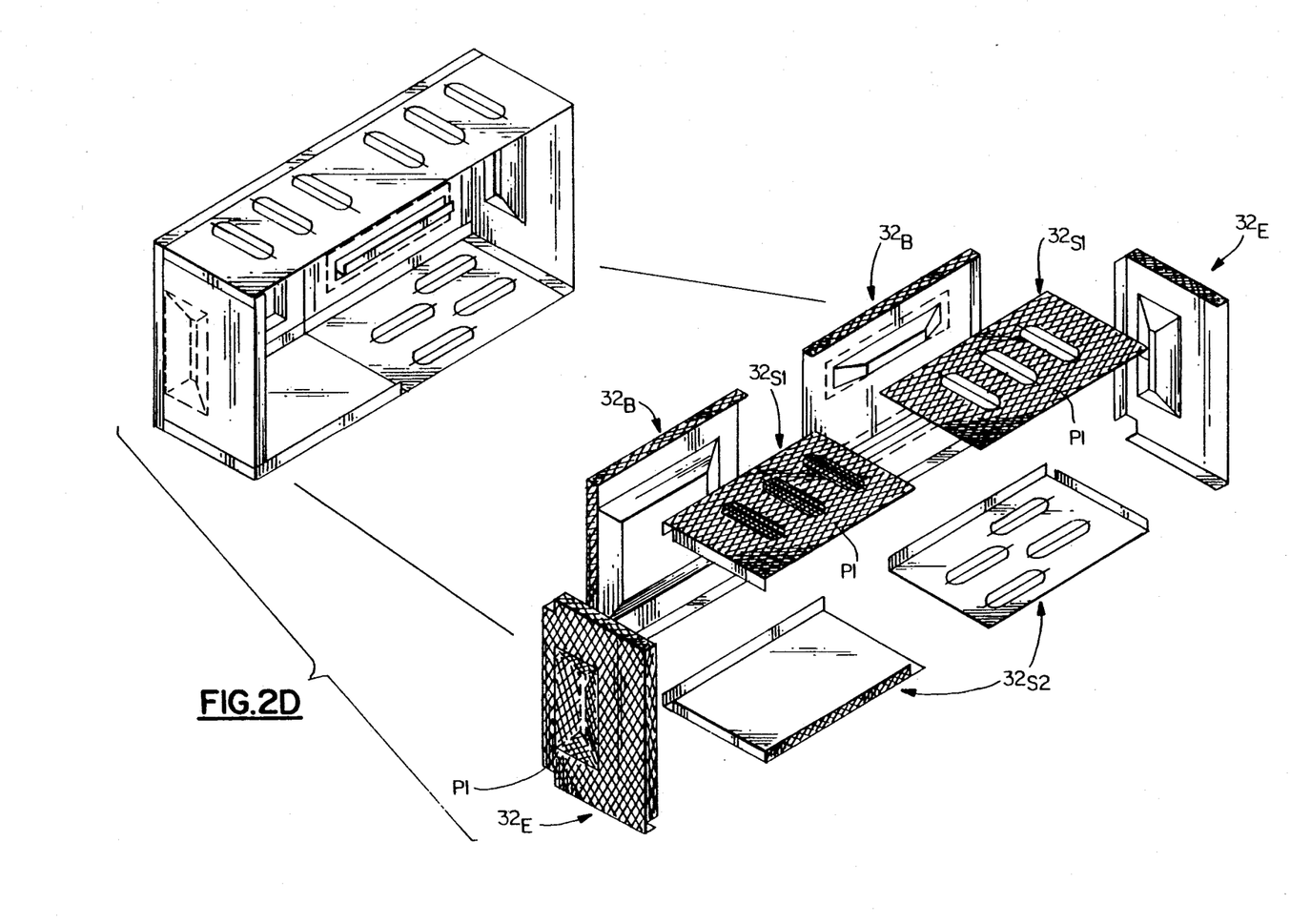
Figure 2E:
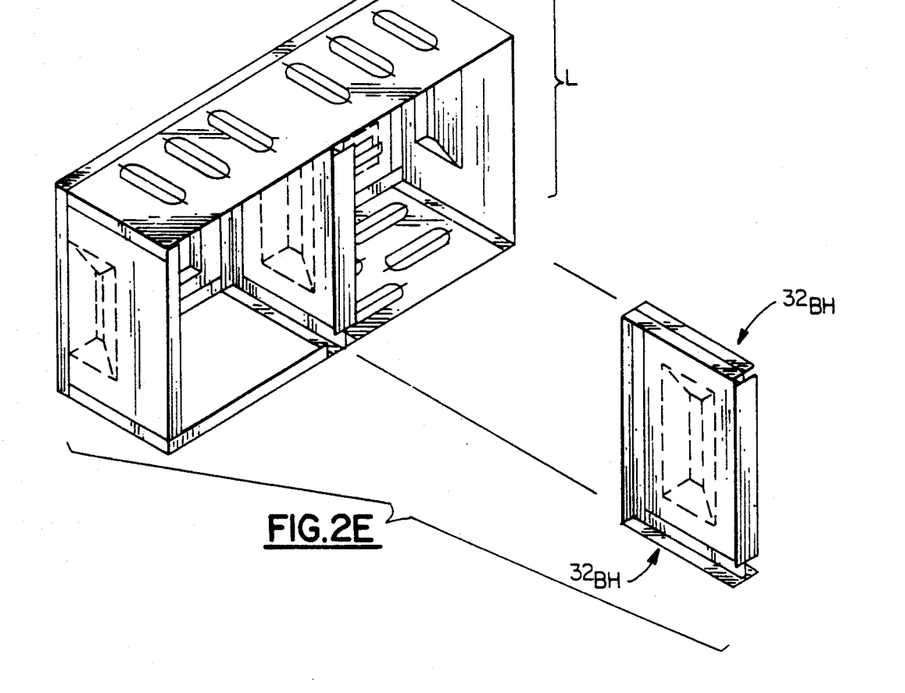

Fiber reinforcement plys Pl are layed up on the facing surfaces 34 of the bottom wall cauls $32_B$, the sidewall cauls $32_{S1}$, $32_{S2}$, the endwall cauls $32_E$, and the bulkhead cauls $32_{BH}$ as illustrated in FIGS. 2D, 2E, respectively. The layed-up conformable cauls 32 are then sequentially installed — first and second bottom walls $32_B$, first and second opposed pairs of sidewall cauls $32_{S1}$, $32_{S2}$, and the endwall cauls $32_E$ — with the layed-up facing surfaces 34 of the cauls 32 in opposed corresponding relation to the interfitted outer fiber reinforcement preforms Pr. Finally, as illustrated in FIG. 2E, the bulkhead cauls $32_{BH}$, with the layed-up facing surfaces 34 in opposed abutting relation, are installed in the mold cavity 18.

The combination of the fiber reinforcement preforms Pr, the fiber reinforcement cap preforms $Pr_C$, and the fiber reinforcement plys P1 define the fiber reinforcement layup L for the composite article to be fabricated. The fiber reinforcement layup L is disposed in the space between the facing surfaces 34 of the conformable cauls 32 and the inner surfaces 16 of the rigid mold 14, which is defined as the plenum 52.

Although not explicitly described in the preceding paragraphs, it will be appreciated that the fiber reinforcement layup L may include structural inserts such as foam cores 40 and/or rigid mandrels 42 and/or integral shaped features such as beaded stiffeners 44 as described hereinabove with respect to FIG. 1. And, while the fiber reinforcement layup L has been described in terms of a combination of fiber reinforcement preforms and plys, it is to be understood that the fiber reinforcement layup L may comprise only fiber reinforcement preforms or plys, depending upon the particular application and the composite article to be fabricated.

And further, as used herein, the term "ply" may encompass dry fibers, woven cloth, braided cloth, knit cloth, mat, stitched layers of fibrous material, tow, yarn, tape, or the like. The term "preform" encompasses any "ply" which has been preliminarily shaped to a configuration coincident to the inner surfaces 16 and/or the facing surfaces 34. The plys/preforms may be any fiber reinforcement material such as glass fiber, carbon, graphite, boron, aramides such as Kevlar TM (E.I. du Pont de Nemours Co., Wilmington, Del.), or other like fibrous materials that are typically utilized in forming resin-impregnated, fiber-reinforced composite articles.

Figure 2F:
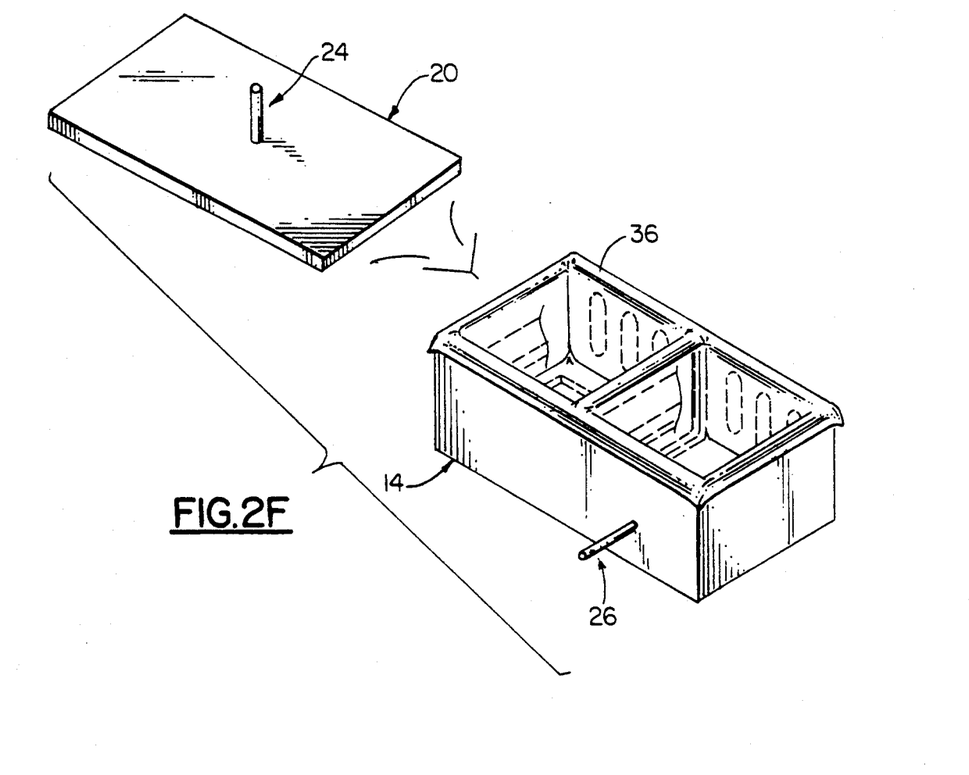

After the fiber reinforcement layup L (including the conformable cauls 32) has been installed in the mold cavity 18, the bladder/liner 36 is inserted into the mold cavity 18 and the cover plate 20 secured as described hereinabove and as illustrated in FIG. 2F. If a non-shaped bladder/liner 36 is being utilized, a pressure differential is developed to bias the bladder/liner 36 into an initial conformable engagement with the non-facing surfaces of the conformable cauls 32. One or more vents 28 are connected to a vacuum source (not shown), and a vacuum is drawn in the space between the bladder/liner 36 and the conformable cauls 32 which causes the residual pressure in the pressure chamber 38 to bias the bladder/liner 36 into initial conformance with the non-facing surfaces of the conformable cauls 32.

The pressure chamber 38 is pressurized to a first predetermined pressure P1 by means of the pressurization source (not shown) interconnected to the pressurization port 24. Any medium capable of providing a fluid pressure may be used. Although air is the preferred pressurizing medium, other gases, oils and hydraulic fluids may also be used. Solid flowable polymer media of the type described in U.S. Pat. No. 4,940,563, entitled "Molding Method and Apparatus Using a Solid, Flowable, Polymer Medium", may also be used.

The first predetermined pressure P1 in the pressure chamber 38, which for the present application was in the range of about 14 to about 20 psi, causes the bladder/liner 36 to expand, biasing adjacent conformable cauls 32 together and providing sealing therebetween. The bladder/liner 36 supports the conformable cauls 32 against the fiber reinforcement layup L such that the plenum 52 defines the net dimensions of the composite article to be fabricated.

Simultaneously with the pressurization of the pressure chamber 38, the vacuum source (not shown) may be operated (if not previously accomplished for bladder/liner 36 conformance) to evacuate the plenum 52 via the vent(s) 28. An RTM resin is then injected under pressure into the evacuated plenum 52 via the resin injection port(s) 26. The RTM resin may be an epoxy, epoxy novolac, or other thermosetting resins such as polyesters, polyimides, phenolic resins, or bismaleimides. Also having utility as the RTM resin is PR500, an epoxy thermoset resin (3M Co., St. Paul, Minn.).

The pressure differential across the conformable cauls 32, i.e., the first predetermined pressure P1 in the pressure chamber 38 exerted through the bladder/liner 36 and the pressure in the plenum 52 exerted by the injected resin, is of sufficient magnitude to bias the conformable cauls 32 away from corresponding inner faces 16 of the rigid mold 14, thereby causing the plenum 52 to expand beyond its original net dimensions. This expansion of the plenum 52 facilitates enhanced resin flow throughout the fiber reinforcement layup L, which ensures complete saturation of the fiber reinforcement layup L. The pressure differential may be regulated as required, by varying the first predetermined pressure P1 in the pressure chamber 38 and/or the resin-injection pressure, to control the resin flow in the fiber reinforcement layup L. After saturation of the fiber reinforcement layup L is achieved, for example, by measuring the resin volume injected or observing resin bleed out through the vent(s) 28, the pressure in the pressure chamber 38 is raised to a second predetermined pressure P2.

For the present application, the second predetermined pressure P2 is about 50 psi. The second predetermined pressure P2, transferred through the bladder/liner 36, is of sufficient magnitude to uniformly bias the conformable cauls 32 into the resin-impregnated fiber reinforcement layup L such that the plenum 52 is restored to the original net dimensions of the composite article to be fabricated. The uniform biasing action exerted by the conformable cauls 32 causes excess resin to be expelled through the vent(s) 28. The expelling action provided by the conformable cauls 32 provides complete fiber wet-out and increases the fiber-to-resin ratio of the resin-impregnated fiber reinforcement layup L.

Figure 2G:
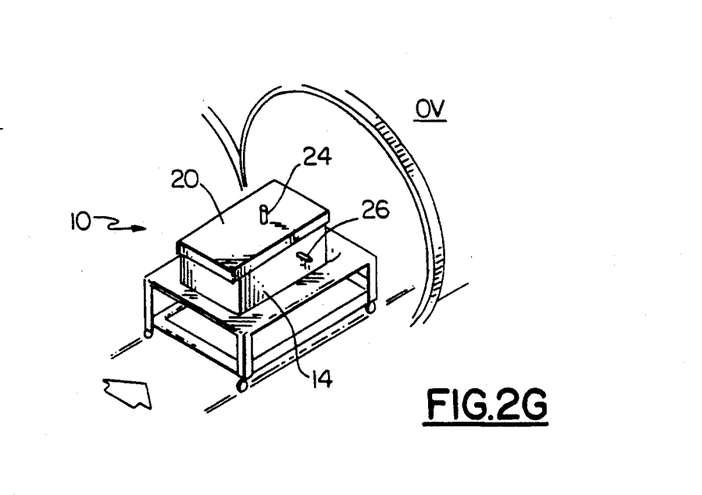

After expulsion of excess resin, the resin pressurization port 26 is closed and disconnected from the pressure source and the composite article mold assembly 10 is placed into an oven OV for curing as exemplarily illustrated in FIG. 2G. The curing cycle for resin-impregnated fiber reinforcement layups is known to those skilled in the art and is dependent primarily upon the RTM resin used. After the cure cycle is completed and the composite article cooled down, the pressure in the pressure chamber 38 is vented. The cover plate 20 is removed from the rigid female mold 14 and the bladder/liner 36 removed from the mold cavity 18. The flexibility of the conformable cauls 32 facilitates the sequential removal of the cauls 32 from the finished composite structure and out of the mold cavity 18. The finished composite structure may then be removed from the rigid female mold 14 to complete the fabrication process.

Figure 3:
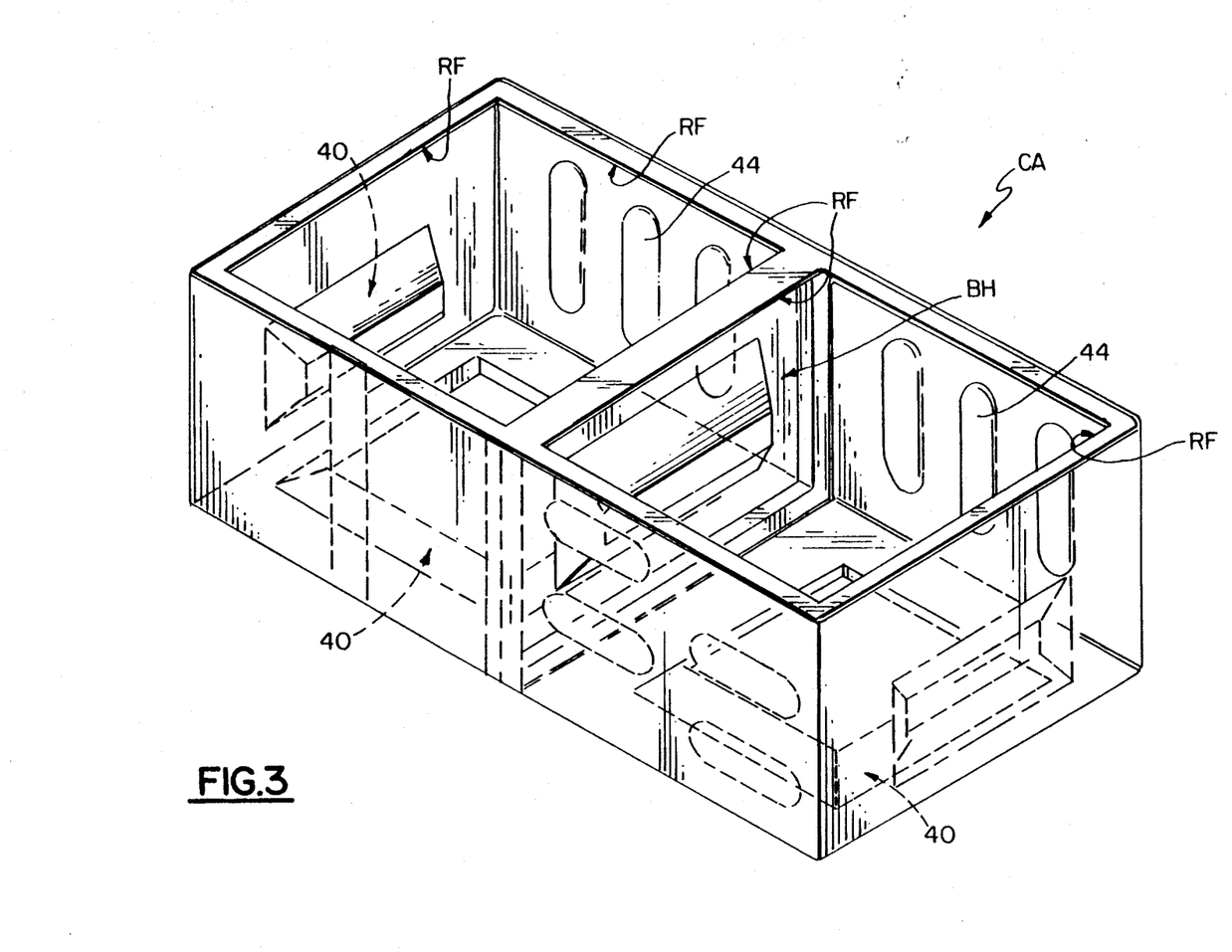
FIG. 3 shows a complex composite article fabricated utilizing the RTM process and molding apparatus of the present invention.

A finished keel beam torque box assembly CA fabricated utilizing the composite article mold assembly according to the process of the present invention is exemplarily illustrated in FIG. 3. The composite article mold assembly and process of the present invention facilitates the fabrication of articles having reverse flanges RF as illustrated in FIG. 3. In addition, the integral fabrication of internal details such as the bulkhead BH may be readily achieved by utilizing the composite article mold assembly and process of the present invention. Other details, such as foam core inserts 40, and beaded stringers 44, may also be readily incorporated in the finished composite article by means of the composite article mold assembly and process of the present invention.

A variety of modifications and variations of the present invention are possible in light of the above teachings. It is therefore to be understood that, within the scope of the appended claims, the present invention may be practiced otherwise than as specifically described hereinabove.

What is claimed is:

1. A resin transfer molding process utilizing a composite mold assembly for fabricating a composite article from a fiber reinforcement layup, comprising the steps of:
    setting up said composite mold assembly by disposing a compliant mold subassembly in combination with a rigid mold subassembly to define a plenum for the fiber reinforcement layup, said plenum having net dimensions defining the composite article;
    exerting a first pressure force against said compliant mold subassembly;
    injecting a resin into said plenum under an injection pressure;
    expanding said plenum as a result of a first pressure differential between said first pressure force and said resin injection pressure to cause enhanced resin flow and saturation of the fiber reinforcement layup;
    exerting a second pressure force against said compliant mold subassembly; and
    restoring said plenum to said net dimensions as a result of a second pressure differential between said second pressure force and said resin injection pressure to cause excess resin to be expelled from the resin-impregnated fiber reinforcement layup to increase the fiber-to-resin ratio of the resin-impregnated fiber reinforcement layup.

* * * * *